(No Model.) 3 Sheets—Sheet 1.
J. D. SCHOFIELD.
PLANTER.
No. 434,051. Patented Aug. 12, 1890.
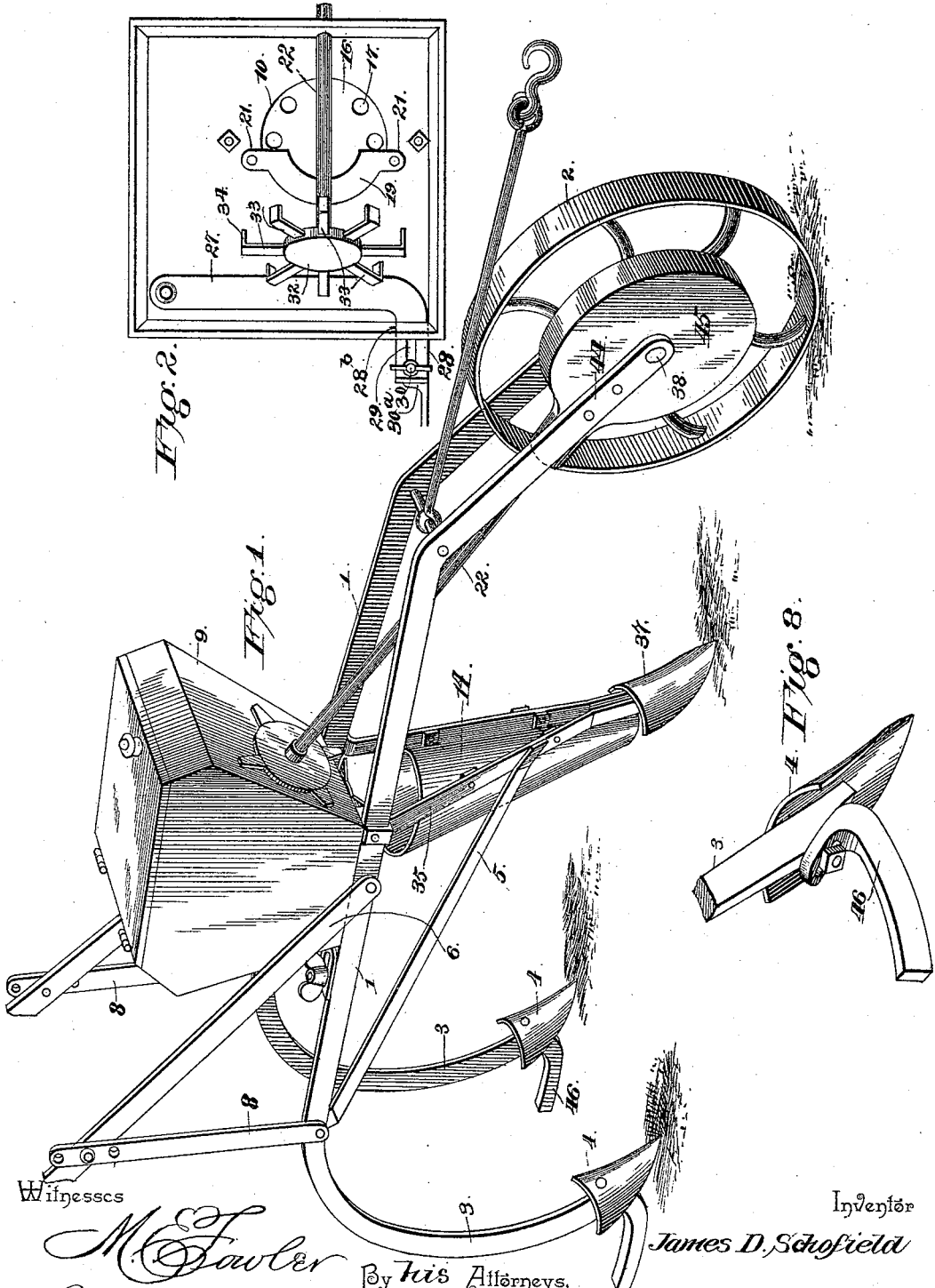
Witnesses
M. Fowler
Wm. Bagger.
Inventor
James D. Schofield
By his Attorneys,
C. A. Snow & Co.

(No Model.) 3 Sheets—Sheet 2.
J. D. SCHOFIELD.
PLANTER.
No. 434,051. Patented Aug. 12, 1890.
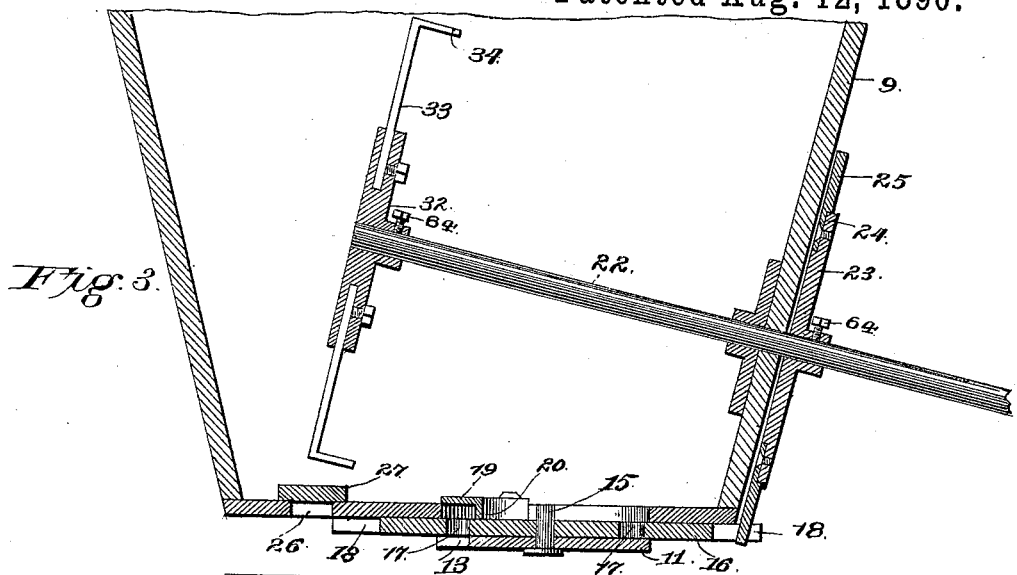
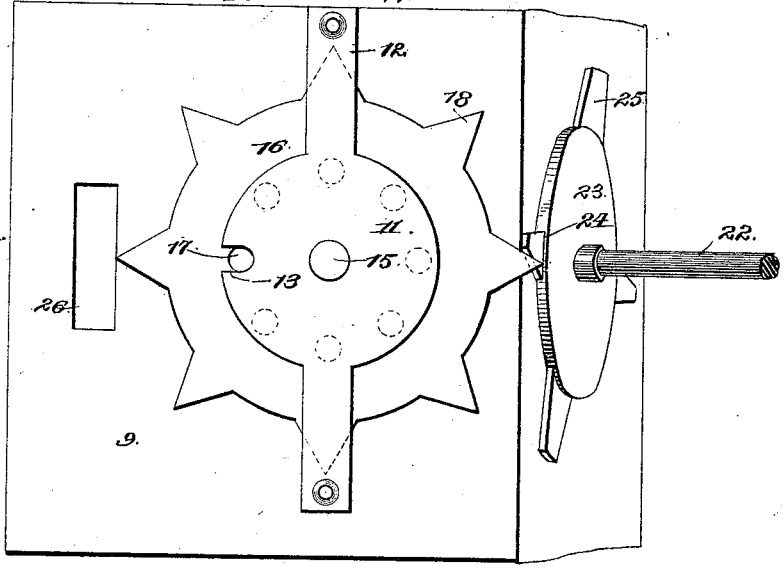
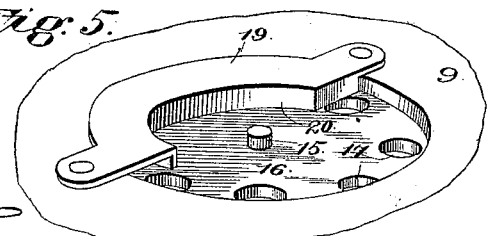
Witnesses
M. Fowler
Wm. Bagger
Inventor
James D. Schofield
By his Attorneys,
C. A. Snow & Co.

(No Model.)  
3 Sheets—Sheet 3.
J. D. SCHOFIELD.
PLANTER.
No. 434,051. Patented Aug. 12, 1890.
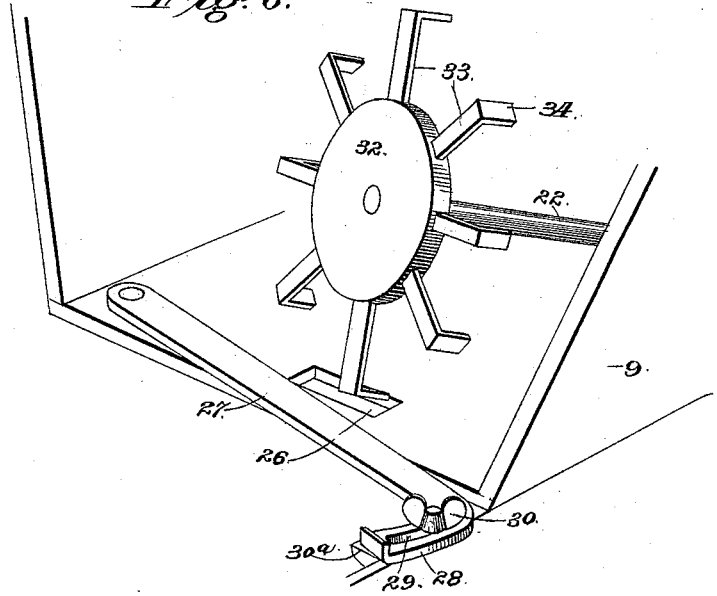
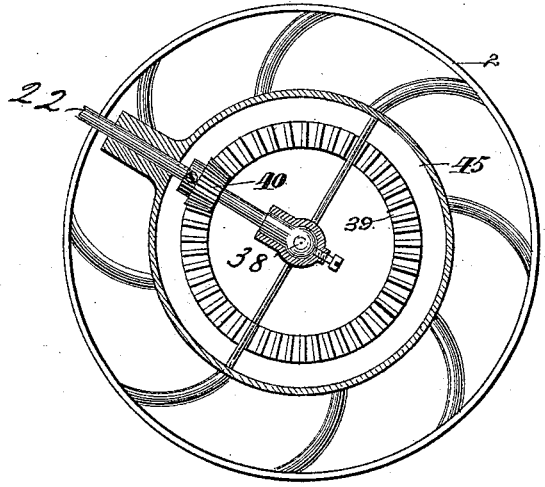
Witnesses  
M. Fowler  
Wm. Bagger
Inventor  
James D. Schofield  
By his Attorneys,  
C. A. Snow & Co.

UNITED STATES PATENT OFFICE.

JAMES DROMMOND SCHOFIELD, OF ROGERS, TEXAS, ASSIGNOR TO THE FREMONT CULTIVATOR COMPANY, OF BELLEVUE, OHIO.

PLANTER.

SPECIFICATION forming part of Letters Patent No. 434,051, dated August 12, 1890.

Application filed October 14, 1889. Serial No. 327,006. (No model.)

*To all whom it may concern:*

Be it known that I, JAMES DROMMOND SCHOFIELD, a citizen of the United States, residing at Rogers, in the county of Bell and State of Texas, have invented a new and useful Planter, of which the following is a specification.

This invention relates to combined corn and cotton planters; and it has for its object to provide a machine of this class which shall be simple, durable, and inexpensive, which may be readily converted from a corn into a cotton planter, and vice versa, which may be easily and effectively adjusted so as to plant the corn in hills at any desired distance apart, and which shall be in every respect convenient and efficient.

With these ends in view the invention consists in the improved construction, arrangement, and combination of parts, which will be hereinafter fully described, and particularly pointed out in the claims.

In the drawings hereto annexed, Figure 1 is a perspective view of my improved seed-planter. Fig. 2 is a top view of the seed box or hopper. Fig. 3 is a vertical sectional view of the same. Fig. 4 is a bottom plan of the hopper and dropping mechanism. Figure 5 is a perspective detail view of the corn-planting mechanism. Fig. 6 is a perspective detail view of the cotton-planting mechanism. Fig. 7 is a perspective detail view of the shield for the drive-gearing of the planter. Fig. 8 is a perspective detail view of the gage-plate for the seed-coverers.

Like numerals of reference indicate like parts in all the figures.

The frame of my improved seed-planter is to be constructed entirely of steel, for the purpose of combining the greatest strength and rigidity with lightness and convenience; and it consists, mainly, of two side bars 1 1, curved downwardly at their front ends to form bearings for the transporting and driving wheel 2, and curved downwardly at their rear ends so as to form standards 3, to which the coverers 4 are attached. The side beams 1 1 are to be connected by means of suitable bars or braces, and handles 6, by means of which the machine may be guided, are attached pivotally to the side pieces, as 7, and connected by means of adjusting-braces 8 with the standards 3.

9 designates the seed box or hopper, which is suitably mounted upon the frame, and the bottom of which has a circular opening 10, under which is secured a circular plate 11, having arms or flanges 12 on diametrically-opposite sides, by means of which it is bolted or otherwise secured to the under side of the hopper. The plate 11 is provided at its edge with an opening or recess 13, through which the seed may drop into the seed-spout 14, which is arranged underneath and will be presently more fully described. The circular plate 11 has a centrally-located upwardly-extending stud 15, upon which is journaled the seed plate or disk 16, which consists of a circular disk provided with a circumferentially-arranged series of openings or seed-cups 17 and an equal number of radially-extending sprockets 18. The seed-cups or openings 17 are so arranged as to register with the openings 13 in the disk 11, so that as the seed-cups pass over the said openings the seed will drop from the said cups and through the said openings into the seed-spout.

Upon the upper side of the hopper-bottom is secured a cut-off, which consists of a segmental plate 19, provided with a downwardly-extending flange 20 at its inner edge, which serves to brush the superfluous seeds from the seed-cups as they pass successively under the said cut-off. The latter is provided with arms or brackets 21, by means of which it may be bolted to the bottom of the hopper in position for operation.

The front side of the hopper is provided with a bearing for the rear end of the operating-shaft 22, upon which is mounted an operating-wheel consisting of a cast-iron hub 23, having radial recesses 24, into which arms or pins 25 may be inserted detachably for the purpose of engaging the sprockets 18 of the seed-wheel 16, which said sprockets project slightly beyond the lower edge of the hopper, so as to be successively engaged by the arms 25 of the operating-wheel. It will be seen that by varying the number of the said arms or the distances between them the seed-wheel will be operated with more or less frequency, thereby regulating the distance between each dropping. It will also be seen that the motion imparted to the seed-wheel is intermittent and jerky, thereby causing the seeds to be ejected forcibly and with absolute certainty from the seed-cups at each operation. The quantity of seed dropped at each operation may be regulated by the size of the seed cups or openings in the seed-disk.

The bottom of the hopper 9 is provided adjacent to and in rear of the circular opening 10 with a transverse slot 26, which forms the seed-opening when the device is used as a cotton-planter. To regulate the size of the said slot, a plate or slide 27 is attached pivotally to the bottom of the hopper near the rear end of the latter and adapted to swing over the slot 26, so as to regulate the size of or completely close the latter, as may be desired. One end of the slide 27 has a rearwardly-extending arm 28 projecting through a slot 28$^b$ in the rear side of the hopper and provided with a slot 29, through which extends a bolt 30, extending upwardly from a bracket 30$^a$, projecting from the hopper, and having a thumb-nut 31, by means of which the slide 27 may be secured in any position to which it may be adjusted. Mounted securely upon the shaft 22, directly above the slot 26, is a cast-iron hub 32, in which is detachably secured a series of radially-extending fingers or agitators 33, the outer ends of which are bent, as shown at 34, for the purpose of forcing the cotton-seed through the slot 26 when the device is to be used as a cotton-planter. The hub 32, as well as the hub 23, which has hereinbefore been described, is mounted upon the shaft 22 by means of a set-screw 64, so that it may be readily moved into or out of operative position, as may be required.

A V-shaped standard 35, the upper ends of which are secured to the side beams of the frame, extends in a forward and downward direction from under the hopper, and is connected with the standards 3 by means of braces 5. A furrow-opener 37 is secured to the lower end of the standard 35, and the seed-spout 14 is suitably secured to the arms of the said V-shaped standard.

The driving and transporting wheel 2 is mounted upon an axle 38, which has its bearings at the front end of the side beams of the frame, and said transporting-wheel is provided with a bevel-gear 39, meshing with a pinion 40 upon the front end of the shaft 22, which is journaled in suitable brackets or bearings upon the frame of the machine and upon the outer side of the seed box or hopper. The motion thus imparted to the seeding mechanism is positive and far more satisfactory than that communicated by belts which are usually employed in this class of machines, and which are liable to slip, or chains which are always liable to get clogged and out of order. The front ends of the side beams of the frame are provided with arms or brackets 44, to which shields 45 are bolted or otherwise secured. These shields entirely inclose the operating-gears and prevent the said gears from being clogged, and thus insuring a steady and perfect operation of the machine.

To the heel ends of the standards 3, carrying the covering-plows 4, are secured the vertically-adjustable gage-plates 46, which serve to regulate the depth to which the covering-plows shall be permitted to enter the soil, thereby causing the seed to be covered to precisely the same depth.

From the foregoing description, taken in connection with the drawings hereto annexed, the operation and advantages of my improved seed-planter may be readily understood. The general construction is exceedingly simple and durable, and the machine may be made much lighter than those which have heretofore been constructed. The machine may be converted from a corn into a cotton planter, or vice versa, and for either purpose it will be found to be exceedingly efficient. When used as a corn-planter, the distance between the hills may be conveniently regulated, and absolute certainty is secured in the planting of the seed whether the device be used as a corn or as a cotton planter.

I desire it to be understood that I do not limit myself to the precise details of construction herein described, but reserve the right to such changes and modifications as may be resorted to without departing from the spirit of my invention.

Having thus described my invention, what I claim is—

1. In a seed-planter, the combination, with the hopper, the bottom of which is provided with an opening, of a circular seed-disk arranged under said opening and having a circumferential series of perforations or seed-cups, a plate having arms or brackets secured to the under side of the hopper, said plate supporting said seed-disk, and a flanged cut-off secured in the bottom of the hopper, the flange of said cut-off occupying the thickness of said bottom and bearing against the upper side of the seed-disk, substantially as set forth.

2. The combination of the hopper, the bottom of which has a circular opening, the circular seed-disk arranged under said opening and having a circumferential series of seed-cups and a corresponding number of radially-extending sprockets, a supporting-plate, a cut-off, and an operating-wheel mounted upon a longitudinal inclined shaft, receiving motion from the drive-wheel at the front end of the planter-frame and having a series of radial pins or arms adapted to engage the sprockets of the seed-disk, substantially as set forth.

3. The herein-described cut-off, consisting of a segmental plate having outwardly-extending arms, by means of which it may be secured to the bottom of the hopper and provided at its inner edge with a downwardly-extending flange adapted to bear against the face of the seed-wheel, substantially as set forth.

4. The combination of the hopper, the bottom of which has a circular opening, the supporting-plate secured under the same and having an upwardly-extending lug, the seed-disk journaled upon said lug and having a circumferential series of seed-cups and a corresponding number of radial sprockets extending beyond the side of the hopper, a shaft journaled longitudinally in the latter, and an operating-wheel mounted upon the said shaft and having a series of radial arms adapted to engage the sprockets of the seed-wheel, substantially as set forth.

5. The combination, with the seed-wheel having the radially-extending sprockets, of the operating-wheel having radially-extending arms and mounted adjustably upon a shaft journaled longitudinally in the hopper, so as to be capable of being thrown into and out of engagement with the said seed-wheel, substantially as set forth.

6. The combination, with the planter-frame consisting, mainly, of the metallic side beams, of the hopper suitably mounted upon the same, the V-shaped standard carrying the furrow-opener, and the seed-spout secured to the said V-shaped standard, substantially as and for the purpose set forth.

7. In a seed-planter, the combination of the supporting-frame, the drive-wheel at the front end of the frame, the hopper, the inclined drive-shaft having its rear end journaled in the front wall of the hopper and provided at its front end with a pinion meshing with a bevel-gear upon the drive-wheel, and the seed-dropping mechanism actuated by said shaft, substantially as set forth.

8. In a seed-planter, the combination of the frame, the drive-wheel at the front end of the frame, the hopper, the inclined shaft having its rear end journaled in the front wall of the hopper and provided at its front end with a pinion meshing with a bevel-gear upon the drive-wheel, a hub having radiating L-shaped arms mounted upon the rear end of said shaft within the hopper, and a hub mounted adjustably upon said shaft in front of the hopper and having radial arms adapted to actuate the seed-dropping mechanism, substantially as set forth.

In testimony that I claim the foregoing as my own I have hereto affixed my signature in presence of two witnesses.

JAMES DROMMOND SCHOFIELD.

Witnesses:
J. S. PUNCHARD,
W. S. HODGE.